United States Patent

Hikida et al.

[11] 3,720,293
[45] March 13, 1973

[54] DISC BRAKE ANTI SQUEAL MEANS

[75] Inventors: Ryotaro Hikida; Takeo Ogasawara, both of Nagoya, Japan

[73] Assignee: Kabushiki Kaisha Toyota Chuo Kenkyusho, Showa-ku, Nagoya-shi, Aichi-ken, Japan

[22] Filed: Aug. 21, 1970

[21] Appl. No.: 66,007

[30] Foreign Application Priority Data

Sept. 1, 1969 Japan .................................. 44/69271

[52] U.S. Cl. ............... 188/73.5, 92/165 R, 188/1 B, 188/71.8, 277/58
[51] Int. Cl. .............................................. F16d 65/00
[58] Field of Search ........... 188/71.8, 72.4, 72.5, 1 B, 188/196 P, 73.5, 370; 277/58; 92/165 R, 168, 253

[56] References Cited

UNITED STATES PATENTS

| 3,502,180 | 3/1970 | Aiki et al. | 188/196 P X |
|---|---|---|---|
| 3,322,244 | 5/1967 | Chouings | 188/71.8 X |
| 3,338,353 | 8/1967 | Lucien | 188/71.8 X |
| 3,421,604 | 1/1969 | Hobbs | 188/72.5 |
| 3,500,969 | 3/1970 | Asher | 188/71.8 X |
| 1,935,393 | 11/1933 | Dodge | 188/1 B |
| 3,085,663 | 4/1963 | Jakeways | 188/71.8 X |
| 3,490,232 | 1/1970 | Baldwin | 92/168 X |

FOREIGN PATENTS OR APPLICATIONS

| 1,390,934 | 1/1965 | France | 188/71.8 |
| 918,206 | 2/1963 | Great Britain | 188/71.8 |

Primary Examiner—George E. A. Halvosa
Attorney—Berman, Davidson & Berman

[57] ABSTRACT

A disc brake of simple construction wherein a supporting member of elastic material is disposed between the cylinder and piston in such manner as to allow the piston to move axially along the cylinder and to vibrate synchronously with the cylinder in the radial direction of the piston, thereby to prevent coupled vibration of the piston and the brake friction pad and to eliminate brake squeal.

12 Claims, 13 Drawing Figures

INVENTORS
RYOTARO HIKIDA,
TAKEO OGASAWARA,

BY Berman, Davidson & Berman,
ATTORNEYS

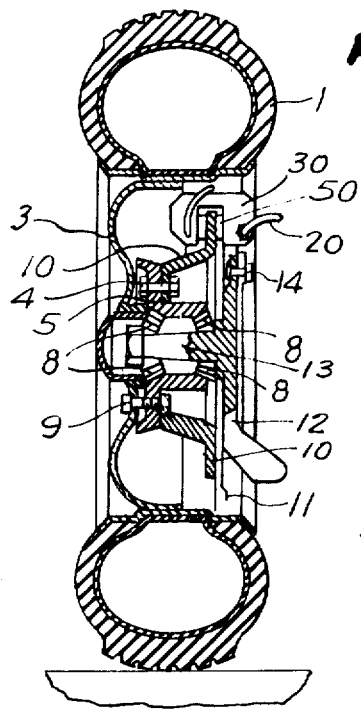

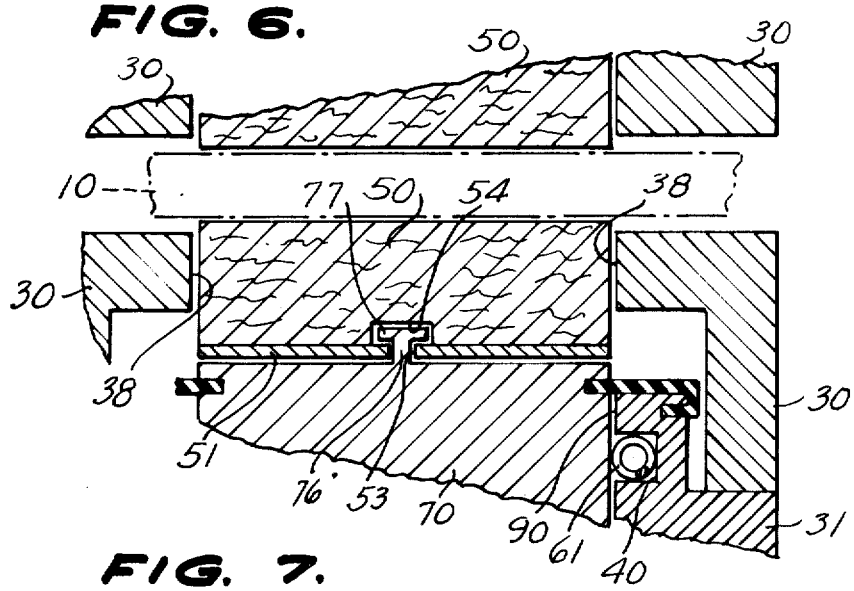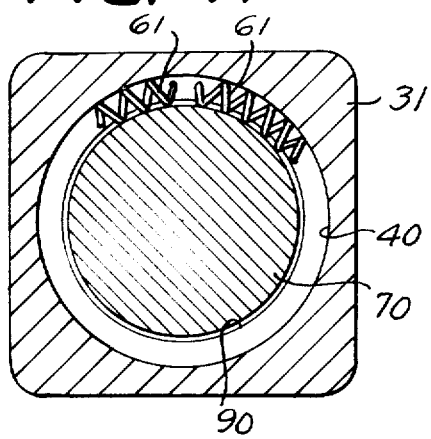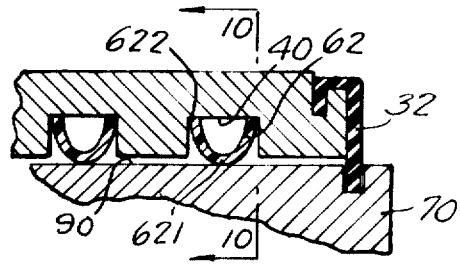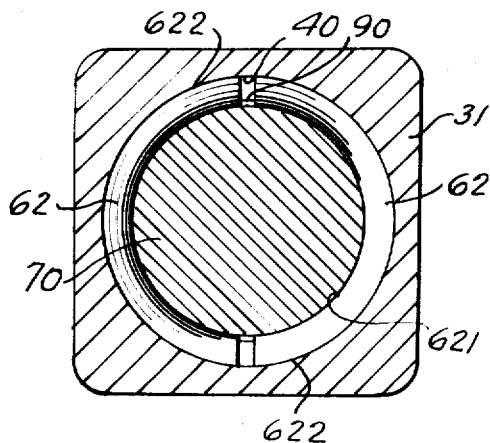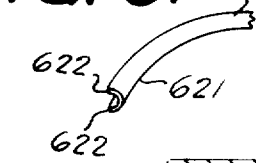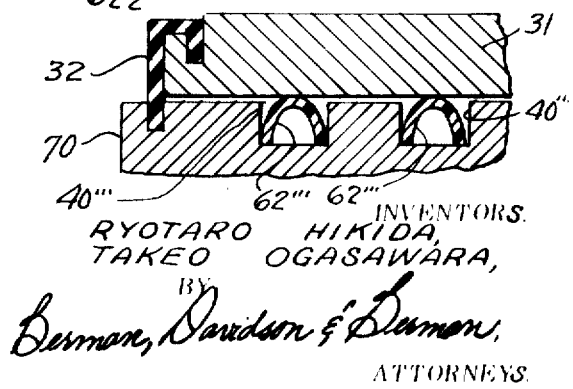

DISC BRAKE ANTI SQUEAL MEANS

BACKGROUND OF THE INVENTION

The present invention relates to disc brakes of the kind in which at least one friction pad is engaged with the opposed surface of a brake disc associated with the motor vehicle's wheel, or the like, and rotated therewith, at least one piston arranged on the opposite side of said pad, and hydraulic actuating means for pressing said piston against the pad and the pad against the disc to brake its rotation.

In conventional disc brakes of the above-described type an uncomfortable and objectionable "brake squeal" occurs when the brakes are applied.

A great many attempts have been made heretofore in the improvement of the frictional material of the pad and the method of damping the pad, none of which, however, has accomplished the essential object of preventing the brake squeal.

The present invention has been achieved by experiment and analysis from which it was learned that the movements and the elastic deformations of the various parts of the brake system at the time of occurrence of brake squeal are very complicated.

The frequency of brake squeal, as measured, was in the order of kilocycles per second, so that when the low frequency vibrations were excluded, it was determined that the coupled vibrations of the pistons, pads, caliper and disc are the cause of occurrence of the brake squeal.

SUMMARY OF THE INVENTION

The objective of preventing brake squeal has been attained in the present invention by interposing a supporting member made of elastic material between the piston and piston cylinder which yet allows the piston to slide freely inside the cylinder. The vibration of the piston, occurring at the time the brake is operated due to the clearance between the piston and piston cylinder, is suppressed by the supporting member, because the piston and piston cylinder dynamically act as one body. Accordingly, vibrations of the friction pad due to piston vibration are suppressed and the objectionable brake squeal is prevented nearly completely.

From the preceding, it will be noted that it is a primary object of the present invention to provide disc brakes in which brake squeal is prevented.

It is another object of the present invention to prevent the aforesaid brake squeal for a long time.

It is a further object of the invention to provide means for preventing brake squeal which can be applied to conventional disc brakes.

It is a still further object of the invention to provide a supporting member disposed between the cylinder and the piston of disc brakes to restrain vibrations of the piston and thereby reduce brake squeal.

BRIEF DESCRIPTION OF THE DRAWINGS

The invention will best be understood by the following description of specific embodiments in connection with the drawings, wherein like reference characters indicate like parts throughout the several figures, and in which:

FIGS. 3 to 7 show a first embodiment of this invention, FIG. 3 is a vertical central section of a car wheel equipped with a disc brake according to the invention;

FIG. 4 is a plan view of the disc brake alone;

FIG. 5 is a vertical sectional view taken along line 5—5 of FIG. 4;

FIG. 6 is a partly broken horizontal section of the disc brake taken along line 6—6 of FIG. 5;

FIG. 7 is a sectional view of the piston and cylinder taken along line 7—7 of FIG. 5 looking in the direction of the arrows;

FIGS. 8 to 10 show a second embodiment of the present invention; FIG. 8 is a fragmentary sectional view of the mutually opposing parts of the piston and cylinder walls;

FIG. 9 is a framentary perspective view of a supporting member;

FIG. 10 is a sectional view, similar to FIG. 7, taken along line 10—10 of FIG. 8; and FIGS. 11, 12 and 13 are sectional views similar to FIG. 8 illustrating still other embodiments of the invention.

Figure 1:
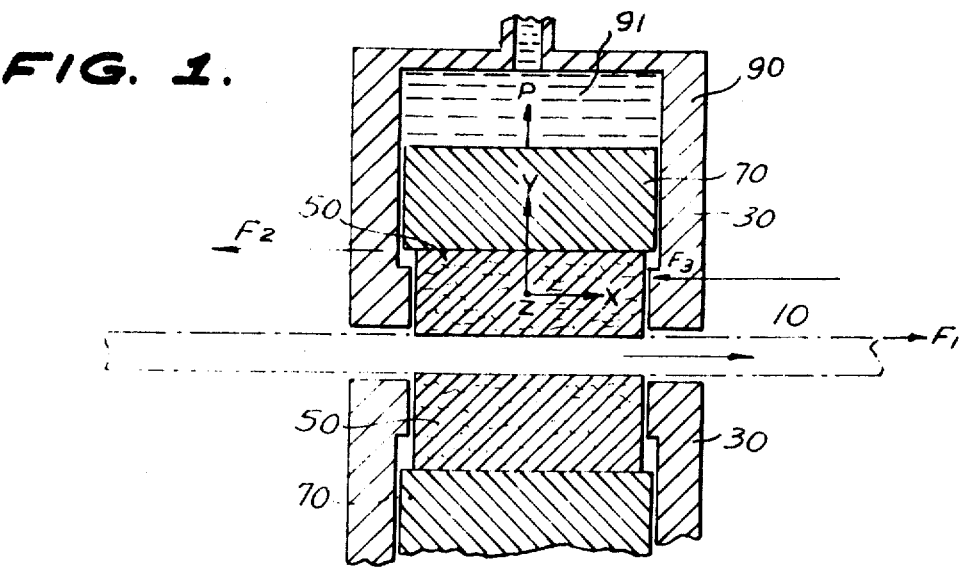
FIG. 1 is a sectional diagram of a disc brake illustrating its principle of operation.

The principle of operation of a disc brake may be considered with respect to FIG. 1. When piston 70 is pressed by the force P of oil 91 in cylinder 90 during braking so that the friction pad 50, touching the top face of the piston 70, is pressed against the rotating disc 10, the frictional force $F_1$ takes place between the pad 50 and the disc 10 and the frictional force $F_2$ acts between the pad 50 and the piston 70. If the frictional force $F_1$ becomes larger than the frictional force $F_2$, pad 50 moves in the direction X (direction of friction) and touches caliper 30, crossing the normal gap (during non-braking) of about 0.1 mm. between caliper 30 and pad 50. In this condition, the counterforce $F_3$ acts from caliper 30 to pad 50 when pad 50 does not vibrate, the sum of frictional force $F_2$ and counterforce $F_3$ equals the frictional force $F_1$.

Applicants conducted various experiments to measure variations of the vibrating acceleration of a pad 50, a piston 70 and a caliper 30 in the direction of X, Y (vertical to the disc) and Z (vertical to both X and Y) of a pad 50 such as shown in FIG. 1, and the changes of brake oil pressure and the brake squeal.

Figure 2:
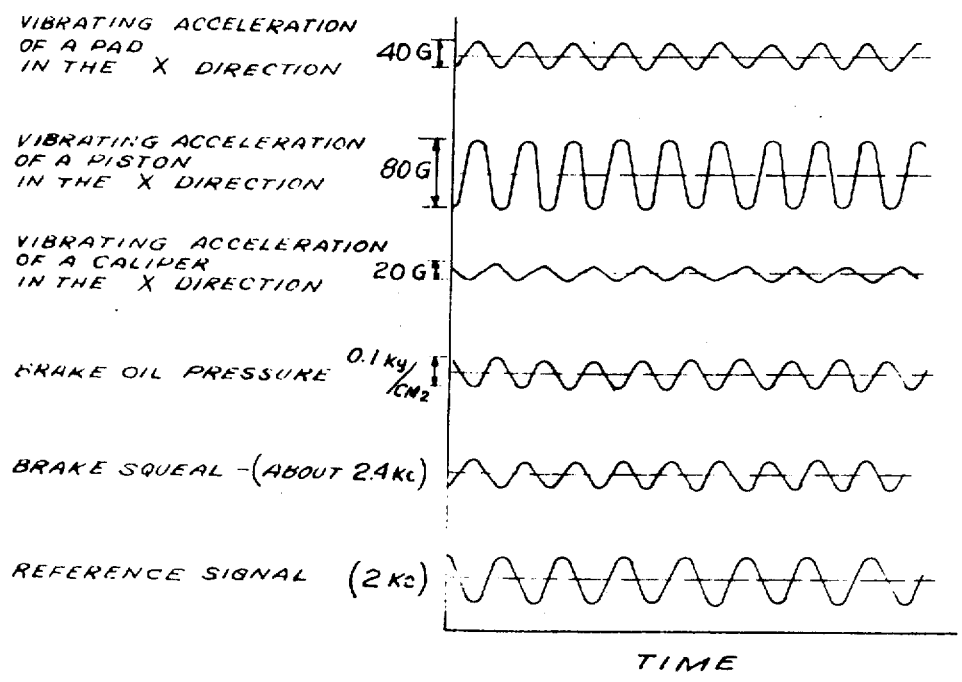
FIG. 2 is a diagram showing the oscillatory signals for a disc brake of the vibrating acceleration in one direction the friction pad, the piston and the caliper, the brake oil pressure, and the brake squeal, as compared with a reference signal.

A part of the measurement data is shown in FIG. 2 together with the reference signal of 2 kilocycles, wherein time is shown as the abscissa, and the vibrating accelerations of the pad, the piston and the caliper in the X direction, the brake oil pressure and the brake squeal as ordinates.

As will appear from FIG. 2, the frequency of the respective vibrating accelerations of the pad, the piston and the caliper in the X direction and the brake oil pressure are about 2.4 kc, nearly identical with the 2.4 kc found to be the frequency of brake squeal.

In the above measurements, the acceleration of the pad in the X direction was about 40 G (here, 1G; the acceleration due to gravity, and same meaning hereafter), the acceleration of the piston in the X direction was about 80G, and the acceleration of the caliper in the X direction was about 20G.

And furthermore, the phases of the acceleration of the piston and that of the pad are almost the same, while the phases of the acceleration of the piston and that of the caliper are different by about 180°.

Measurements of the acceleration of the Y direction at the central and end portions of the pad confirm that the frequency of the pad acceleration was about 2.4 kc/s, and that the acceleration was large at the center while it was small near the area of contact with the caliper. This fact shows that the pads have elastic bending vibration, and, the disc also has elastic bending vibration at the same frequency as that of the pad making contact therewith.

Considering with the above-mentioned data, the results of various other experiments, it was found that, during brake squeal, the parts of the brake system have elastic coupled vibration in a unique vibrating mode. Further experiments were carried out changing the form, rigidity and supporting point of the pad, the clearance between the piston and the piston cylinder, and the friction between the pad and the piston. As a result, it was found that the combination of the bending vibration of the pad, the friction between the pad and the piston, the rotating vibrations of the piston around the X and Z axes, the vibration of the caliper in the X direction, the bending vibration of the disc, and the friction between the disc and the pad are the principal causes of brake squeal, and that other factors have only secondary influence.

Upon further testing and analysis of test results, applicants have reached the conclusion that especially an unstable force due to the combination of the vibrations of the piston and the pad in the X and Y directions, is a primary cause of brake squeal. Accordingly, to prevent the occurrence of brake squeal, it is necessary to reduce this unstable force. Various methods are possible for this purpose, such as (1) changing the coupled vibration mode, (2) cancelling the unstable force by damping, and (3) employing the two preceding methods simultaneously. Specifically, the rocking of the piston in the gap between the piston and the caliper wall may be suppressed by connecting the piston to its supporting mechanism by elastic members such as springs, thereby preventing the combination of vibrations of the piston and the pad, and/or the effective friction damping force given to this vibration mode, thereby minimizing the unstable vibration.

Accordingly, the present invention is characterized by the disposition of an elastic supporting member between the piston and the piston cylinder so that the piston is able to slide to press the brake disc without vibrating relative to the cylinder and/or the caliper. Thus, the vibration of the piston is suppressed and the bending vibration of the pad is eliminated, thereby preventing the occurrence of brake squeal.

DESCRIPTION OF PREFERRED EMBODIMENTS

The embodiments of the present invention as applied to a Dunlop type disc brake of a car will be explained as follows, referring to FIGS. 3–7.

The disc brake is mounted to the car wheel 1 which rotates freely on hub 5. The hub is journaled through the medium of roller bearing 8 on the shaft 13 which is fixed to the steering knuckle 12. The wheel disc 3 and the brake disc 10 are fixed to the hub 5 by the bolts 9 and 4, respectively, FIG. 3.

The brake disc 10 is of hat-shape with a flat rim which is placed between two opposed brake friction pads 50 held within the caliper 30. The caliper is fixed to the knuckle 12 by bolt 14. One end of the oil pressure pipe 20, whose other end is connected to the master cylinder (not shown) is connected to the caliper. A dust cover 11 for the brake disc 10 is provided on the steering knuckle 12.

The brake disc 10 rotates with the wheel 1, while the car is running, but when the brake pedal is pressed down by foot for stopping the car, the oil compressed within the master cylinder enters the cylinders within the caliper 30 through the pipe 20 and presses the pads 50 toward disc 10. The pads 50 are placed at both sides of the disc 10, so that the frictional force increases as the disc 10 is pressed by the pads, and, as a result, the car is stopped.

As thus far explained, the brake assembly is more-or-less conventional. FIGS. 4 to 7 show the first embodiment of the invention in which a ring-shaped spring 61 (FIG. 7) made of spring steel is disposed as a supporting member in a groove 40 of the piston cylinder wall 31 to hold the piston 70.

The caliper sides 31, which hold the pressure fluid cylinders 90, are fixed by bolts to caliper 30 at opposite sides of the rim of the brake disc 10 straddling the disc rim. The pressure fluid pipes 20 are fixed by nuts 21 to the cylinder walls 31 to connect the pipes with the cylinder chambers 92. A friction pad 50, to press the disc 10, is interposed between the disc and each piston 70 fitted into its cylinder 90.

Each piston 70 has a central projection 76 terminating in a crosshead 77 (FIG. 6) extending forwardly toward the pad 50. The rear side of each piston has mounted therein an automatic gap compensating device including a spring 95 (FIG. 5) to pull back the piston when the pressure of operating oil in pressure chamber 92 is removed (i.e., when braking is released). A rubber ring 71 for sealing the pressure oil, and a rubber boot 32 for preventing the entrance of dust, are disposed, respectively, between the end wall 31 housing the cylinder 90 and the piston 70 in two circumferential grooves formed in the peripheral wall of the piston 70.

An annular groove 40 is provided in each cylinder wall near the cylinder opening, and the ring-shaped spring 61 is disposed in this groove. The spring 61 is formed of helically, or spirally, coiled wire and shaped into an annulus which may be easily placed in groove 40 of the same shape. The width of groove 40 is slightly larger than the outer diameter of the coils of spring 61. Preferably, the outer diameter of the coils of the spring 61 is made slightly larger than the depth of the groove 40, so that the spring protrudes from the groove to engage the side wall of the piston 70. Thus the piston 70 is supported by the spring 61, which restricts radial movements of the cylindrical piston (FIG. 7).

A notch 53 open at its lower end for loosely inserting the projection 76 of the piston, is formed through the back plate 51, which is secured to the surface of the pad 50 opposite to the piston 70, and a groove 54, communicating with the notch 53, is provided in the pad 50 to loosely receive the crosshead 77 of the piston projection 76. The front and rear inside walls 38 of caliper 30, in the rotating direction of the brake disc 10, face the side walls of the pad 50, being spaced therefrom by a very small gap, and when the pad is moved in the rotating direction by being pressed against the brake disc, the pad wall crosses the gap and engages the caliper wall 38, which thus becomes the surface of the reaction force. A lower plate 39, FIG. 5, on which pad 50 moves freely, is fixed to the lower end of the caliper 30 in such a way as to permit the pad to slide thereon after assembly of the pad on the piston and during braking.

The pad 50 can be set and removed freely, and when it is to be set, the groove 53 of the back plate 50 and the groove 54 pad are engaged with the projection 76 and the crosshead 77 of the piston 70, and the pad is pressed downward until it contacts the lower plate 39, so that the pad 50 is loosely fitted to the piston 70.

The fixing part 34, FIG. 5, of inverted U-shape in cross-section, is then engaged over the bridge 33 set on the upper end of the central part of the side walls of the caliper 30, to which part 34 is fixed by bolt 36 and nut 35. Two outwardly bent portions 37 are formed at the free ends of said fixing part 34, and these are placed on the pads 50, thereby preventing the upward movement of the pads and their escape from the caliper.

When pressure is applied to the oil within the pressure chamber 92 during braking, the piston 70 presses the pad 50 and the pad 50 presses the brake disc 10. There being two friction pads, pressure is applied from both sides to suppress rotation of the disc. When braking pressure is released, piston 70 is returned to its original position by action of the spring 95. Pad 50 is returned to its former position by the crosshead 77 of the piston engaged with the pad.

Pad 50 slides in the rotational direction of the disc 10 relative top piston 70 within the range of clearance between the notch 53, the groove 54 and the corresponding projection 76 and crosshead 77. Thus the frictional force between the brake disc 10 and the pads 50 becomes the braking force, the pad making contact with the inside walls 38 of the caliper 30 at a point or area serving as the reaction force point.

Since the piston 70 is resiliently supported by the spring 61 disposed in groove 40 within cylinder housing wall 31, the piston 70 is dynamically combined into one body with the cylinder, its housing wall 31 and the spring 61, and vibration of the piston 70 caused by the frictional force between the piston 70 and pad 50 is inhibited and virtually eliminated. Accordingly, the bending vibration of the pad 50 and the coupled vibration between the pad 50 and the brake disc 10 usually caused by vibration of the piston 70, are greatly minimized, and brake squeal is prevented.

When the contact area of the spring 61 with the piston 70 is positioned as close as possible to the contact plane of the piston 70 and the pad 50, rocking of the piston 70 is effectively inhibited by the spring 61, and therefore the bending vibration of the pad 50 is nearly completely prevented. This also contributes notably to the prevention of brake squeal.

The vibration of the piston in the forward direction of the brake disc (the said X direction), which is the main direction of vibration of the piston, is permitted by the spring 61, which contacts the side wall of the piston 70 circumferentially to restrict vibration of the piston in its radial directions. The vibration of the piston in the direction perpendicular to the X direction, the aforesaid Z direction, and the like vibration in all radial directions of the piston are however restricted by spring 61 and therefore brake squeal is further prevented.

Added to the above effects arising from the spring resilience, is the damping effect on the piston 70 due to the contact friction between the spring 61 and the side wall of the piston 70 in the circumferential direction, and between the spring 61 and the cylinder groove 40, which serve to prevent the occurrence of brake squeal more effectively.

A second embodiment of the invention is shown in FIGS. 8–10, and is characterized by use of a half-annulus, or saddle-shaped member 62 (FIG. 9), made of an elastic material, such as a plastic or the like, as a supporting member which replaces half of the spring 61 of the first embodiment.

The saddle-shaped member 62 is substantially of U-shaped section, and is curved into a half-ring, or saddle shape, with the bottom of the U bent inwardly. The radius of curvature of the external surface 621 (the piston contacting surface of the saddle member) of member 62 is approximately equal to the radius of piston 70, and the radius of curvature of both edges 622 (FIG. 9) of the two legs forming the U-section of member 62 is approximately equal to that of the bottom surface of the groove 40 in the cylinder housing wall 31. The width of member 62 is formed to be slightly narrower than that of the groove 40.

Accordingly, when two saddle-shaped members 62 are disposed in the groove 40 to nearly fill the same, the external bottom surfaces contact the side surface of piston 70 in its circumferential direction, and the edge surfaces 622 contact the bottom surface of the groove 40. Thus the piston 70 is supported by members 62 about its complete circumference and restricts all vibrations of the piston in its radial directions. In the second embodiment, the saddle-shaped members 62 exhibit the same operational effect as described for the spring 61 in the first embodiment, but the force restricting the vibration of the piston 70 is larger, and therefore, the occurrence of brake squeal is prevented even more effectively.

The supporting members 61 or 62 may be disposed in a groove provided in the cylinder wall 31 holding the piston, as shown and described in the above embodiments, or in a groove 40' provided in the piston surface, see FIGS. 11 and 13. In FIG. 11 groove 40' seats resilient supporting member 61' similar to member 61, and operates, in virtually the same manner to provide the same anti-vibration effect which lessens brake squeal, as described in the preceding embodiments. In FIG. 13 a pair of grooves 40''' in the piston seat a pair of double members 62''' similar to members 62 of FIG. 8.

An alternative construction which may be readily visualized would be to place a strip of elastic material as the supporting member in the gap between the piston and the cylinder.

Further, by providing the cylinder 90 with an enlargement 40'' at its mouth, a coil spring supporting member 62'' may be seated in said groove formed by the enlargement and between the base of the groove and the piston, see FIG. 12. This construction has the advantage of moving the supporting member closer to the friction pad.

In the above-described first embodiment, a single groove is provided in one of the associated surfaces of the cylinder and the piston, and the supporting member is interposed therebetween, but two, or more, grooves may be provided circumferentially and parallel to each other and two or more supporting members may be disposed in said grooves, see FIGS. 8 and 13, so that the piston may be prevented from rocking more effectively, thereby to prevent coupled vibration of the piston and the pad, and to better prevent brake squeal.

The vibration of the piston is largest, as mentioned, in the rotational direction (the aforesaid X direction) at the brake disc, and therefore brake squeal can also be prevented effectively by providing two parallel supporting members, one on each opposite side of the piston, and parallel to the aforesaid radial or Z direction of the brake disc, so as to inhibit the vibration of the piston in the X direction. Alternatively, a single supporting member may be provided in the gap between the piston and the cylinder which is thick enough to push the other side of the piston into contact with the side wall of the cylinder. (In the last case, it is preferable that the supporting member be interposed in the Z axis radial direction of the brake disc as in the previous case.)

It should be apparent from the above, that it is preferable to use a supporting member, such as those described, which is strong enough to withstand the force generated when the piston moves together with the pad, and which is sufficiently elastic so as not to be destroyed by the frictional force caused by the forward and backward movements of the piston, and which yet does not prevent the piston from sliding easily in its forward and backward directions.

To render the piston easily slidable, the supporting member may be contacted by the piston, or by the cylinder, at many points by use of a member such as the spring 62, or may be contacted along a line by use of a member such as the saddle-shaped member 62 or by use of a member having an even smaller surface area, thereby to obtain a low friction condition. When the area of the contact surface is relatively large, or the material from which the supporting member is made has a large coefficient of friction, a suitable lubricant, such as an oil or fat, may be applied to the said contact surface. The piston can also be made easily slidable by using a supporting member made of low friction plastic, such as tetrafluorethylene, or by using a supporting member lined, or coated with a low friction plastic, or metal.

It should also be evident, that the supporting member is not limited to the steel spring or the saddle-shaped plastic member as described in embodiments 1 and 2. Instead, the supporting member may be formed as a ring having a circular or square cross-section. The supporting member need not be a ring fully encircling the piston but may be in the form of one, or more, rods or plates. Obviously the supporting member may be formed of hard rubber, rigid plastics, or low friction plastics containing a reinforcing filler of metallic material having the properties of elasticity and toughness. When the ring supporting member is made of rubber, and is used in place of the spring of the first embodiment, it is also effective for preventing leakage of the operating oil. Moreover, when an oil impregnated sintered material, or metallic powder, is employed as the metallic ring or plate member, it is also effective for improving the sliding characteristics of the piston.

When a part of the elastic supporting member is secured to the cylinder, the caliper, or the like, and another portion is pressed against the piston, or, when a part of the supporting member is secured to the piston and another part is pressed against the cylinder, the caliper, or the like (to such a degree as not to prevent movement of the piston to press the pad during braking), the vibration of the piston is inhibited by damping action based on friction of the pressing portion of the supporting member, and therefore the occurrence of brake squeal is prevented in accordance with the principles and theory of the present invention.

While the invention has been explained in connection with a Dunlop type disc brake, it should be understood that it is equally applicable to disc brakes of the Girling type, and of other types, and that many changes of design are possible without departing from the spirit and scope of the invention.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A disc brake comprising a rotatable disc, a caliper straddling a portion of the periphery of the disc, an axially movable piston in a cylinder of the caliper operated by fluid pressure, a pad of friction material held within the caliper and pressed against the disc by said piston, at least one sealing member disposed between the cylindrical walls of said cylinder and piston for sealing pressure fluid, and at least one piston supporting member made of metallic material having properties of elasticity and toughness, said member being disposed between the cylindrical walls of said cylinder and said piston and secured to one of the cylinder and piston so as to be secured to one of the cylinder and piston so as to be fixed against movement axially with respect thereto in such manner that the movement of said piston in its radial direction is restrained by said supporting member, said piston supporting member being hollow and having a cross-sectional shape such as to make the supporting member resiliently deformable in a radial direction, said piston supporting member having a convexly rounded sliding abutment contact surface which is presented between the piston and the cylinder, while permitting sliding movement of the piston axially along the cylinder during braking, thereby to restrict coupled vibration of said piston and pad, and to reduce the brake squeal.

2. A disc brake according to claim 1, wherein the inner surface of said cylinder is formed with a stepped bore having an enlarged diameter at its open end, and said supporting member is seated in the space between the enlarged diameter portion of the stepped bore and said piston.

3. A disc brake according to claim 1, wherein a circumferential groove is provided in one of said cylinder and piston, and said piston supporting member is seated in said groove with a portion extending therefrom into slidable contact with the other of said cylinder and piston.

4. A disc brake according to claim 3, wherein said groove is provided in said cylinder, and said supporting member is seated in said groove and has a portion slidably contacting the associated side surface of said piston.

5. A disc brake according to claim 3, wherein said groove is provided in the side surface of said piston and said supporting member is seated in said groove and has a portion slidably contacting said cylinder.

6. A disc brake according to claim 3, wherein said supporting member is a coiled wire shaped in the form of a ring.

7. A disc brake according to claim 3, wherein said supporting member includes a saddle-shaped member having a U-shaped cross-section, both edges of said member at the mouth of the U-shaped section being in contact with the bottom of said groove, and the intermediate portion of said member at the bottom of the U-section extending from the groove.

8. A disc brake according to claim 3, wherein a friction-reducing lubricant is added to said supporting member to keep said piston freely slidable.

9. A disc brake according to claim 3, wherein the surface of said supporting member which engages the piston is coated with a low friction material.

10. A disc brake according to claim 3, wherein a plurality of circumferential grooves are provided parallel to each other in said cylinder or piston, and a supporting member is disposed in each of said grooves.

11. A disc brake according to claim 10, wherein each said supporting member is a coiled wire shaped in the form of a ring.

12. A disc brake according to claim 10, wherein said supporting members are ring members, each including a saddle-shaped member having a U-shaped cross-section.

* * * * *